United States Patent
Goldbeck et al.

(10) Patent No.: US 7,447,575 B2
(45) Date of Patent: Nov. 4, 2008

(54) OPERATOR CONTROL SYSTEM FOR AN AUTOMOBILE

(75) Inventors: Kai Goldbeck, Leinfelden-Echterdingen (DE); Friedemann Kuhn, Reutlingen (DE); Kay Schattenberg, Stuttgart (DE); Matthias Wagner, Schwaebisch Gmuend (DE)

(73) Assignee: Daimler AG, Stuttgart (DE)

( * ) Notice: Subject to any disclaimer, the term of this patent is extended or adjusted under 35 U.S.C. 154(b) by 63 days.

(21) Appl. No.: 10/571,918

(22) PCT Filed: Aug. 28, 2004

(86) PCT No.: PCT/EP2004/009605

§ 371 (c)(1),
(2), (4) Date: Nov. 14, 2006

(87) PCT Pub. No.: WO2005/036375

PCT Pub. Date: Apr. 21, 2005

(65) Prior Publication Data
US 2007/0168089 A1    Jul. 19, 2007

(30) Foreign Application Priority Data
Sep. 16, 2003   (DE) ................................ 103 42 666

(51) Int. Cl.
*G06F 7/00* (2006.01)
(52) U.S. Cl. .......................................... 701/36; 701/50
(58) Field of Classification Search .................. 701/1, 701/36–41, 50; 340/461; 345/163, 164, 345/167
See application file for complete search history.

(56) References Cited

U.S. PATENT DOCUMENTS 6,240,347 B1 *  5/2001  Everhart et al. ................ 701/36
6,571,154 B2 *  5/2003  Worrell et al. .................. 701/1

FOREIGN PATENT DOCUMENTS

| DE | 36 11 358 A1 | 10/1987 |
| DE | 41 21 180 A1 | 1/1993 |
| DE | 197 52 056 A1 | 5/1999 |
| DE | 100 32 375 A1 | 1/2002 |
| DE | 100 50 223 A1 | 4/2002 |
| EP | 1 228 917 A1 | 2/2001 |
| WO | WO 02/40307 A1 | 5/2002 |

OTHER PUBLICATIONS

International Search Report (Mar. 30, 2005).
German Office Action (Nov. 26, 2003).
German Office Action w/English Translation dated Apr. 12, 2007 (Eight (8) pages).

* cited by examiner

Primary Examiner—Richard M. Camby
(74) Attorney, Agent, or Firm—Crowell & Moring LLP

(57) ABSTRACT

An operator control system for a vehicle includes a visual display unit for displaying at least one operator control function; and at least one central manual operating device is associated with the visual display unit, for operator control of the at least one displayed operator control function. In addition, at least one further manual operating means, as well as at least one sensor which detects when an object approaches the at least one further operating means. The visual display unit displays an operator control function associated with the further manual operating means when such an approach is sensed.

13 Claims, 1 Drawing Sheet

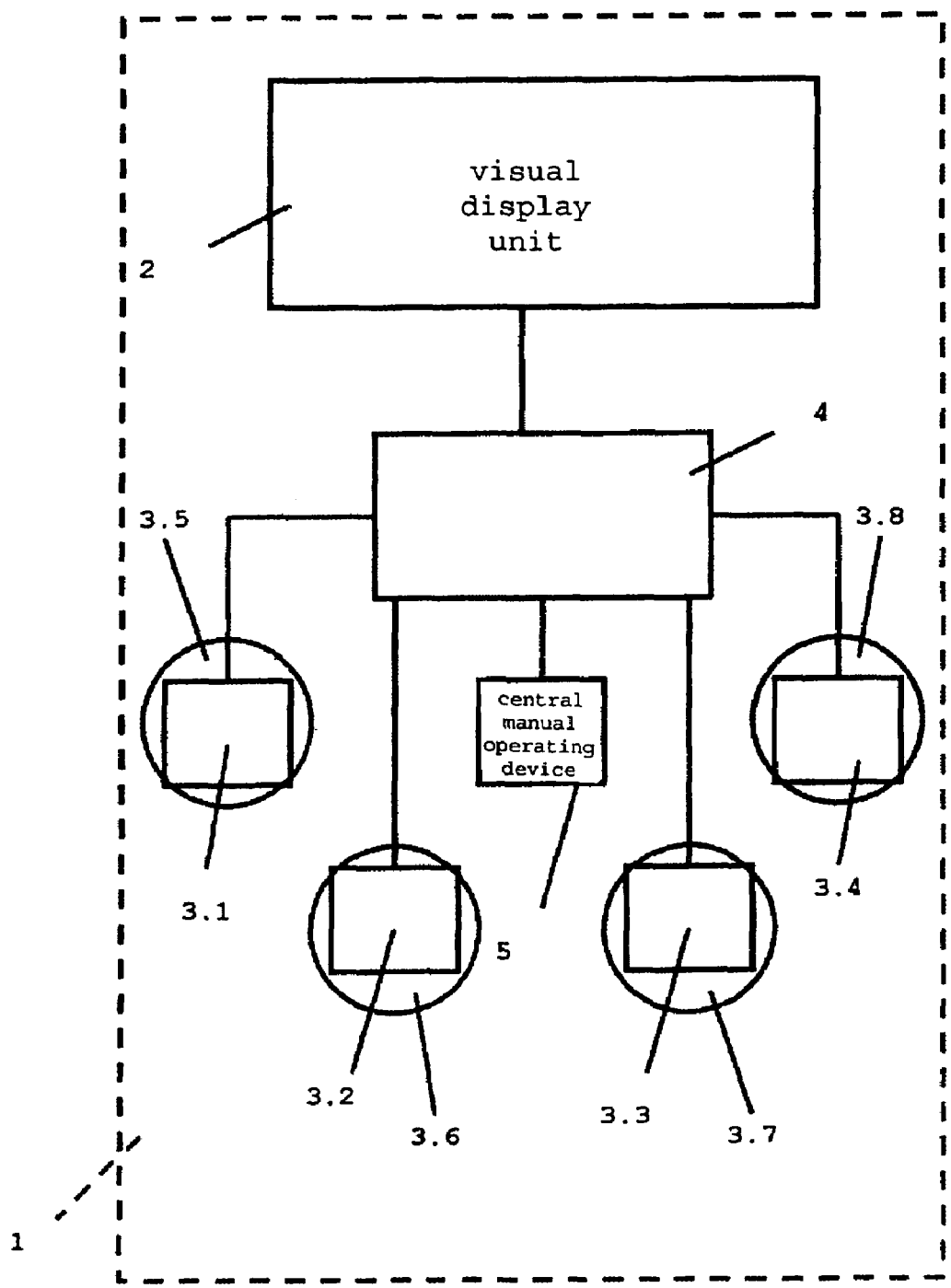
Figure

OPERATOR CONTROL SYSTEM FOR AN AUTOMOBILE

BACKGROUND AND SUMMARY OF THE INVENTION

The invention relates to an operator control system for a vehicle.

German Patent Document DE 197 52 056 A1 discloses an operator control system for controlling a screen display in which operator control functions displayed on a visual display unit can be subjected to operator control by a manual operating means associated with the visual display unit. The components are spatially separated from one another in the vehicle, and no further manual operating means are provided for subjecting the displayed operator control function to operator control.

German Patent Document DE 36 11 358 A1 discloses a visual display unit which is designed in the form of a contact area, and has at least one proximity sensor that is arranged in the edge region and serves for manual operation of a displayed operator control function. The proximity sensor senses when an object (for example, a finger) approaches the visual display unit, and initiates an operator control function which is associated with the region of the display unit approached. The visual display unit and the manual operating means in the form of the at least one proximity sensor are designed in the form of a "touch screen".

One object of the invention is to provide an improved operator control system for a vehicle, which system makes operator control easier.

This and other objects and advantage are achieved by the operator control system according to the invention, which includes a central manual operating device which is associated with a visual display unit and can be used by the operator to control a plurality of operator control functions that can be displayed on the visual display unit. According to the invention, at least one further manual operating device is permanently associated with an operator control function, and at least one sensor is provided to detect when an object (for example, a hand of the user) approaches the further operating device. The operator control function, which is associated with the further manual operating device, is displayed on the visual display unit after the approach to an further manual operating means is sensed.

The displayed function can now advantageously be controlled by the operator using the manual operating device associated with the visual display unit and/or the at least one further manual operating means, in a redundant manner.

In addition, not only the operator control function associated with the further manual operating means, but also other functions that belong to such operator control function, can be controlled by the operator using central operating device associated with the display unit. It is of course also possible that only the operator control function associated with the at least one further operating device is subjected to operator control.

The operator control functions are preferably displayed on the visual display unit using a menu structure.

In one refinement of the invention, the visual display unit is arranged separately from its associated manual operating device, for example, outside the driver's reach, with the associated manual operating device being arranged centrally within the driver's reach (for example, in the center console between the seats or in a door lining).

The manual operating means, which is associated with the visual display unit, may be in the form of a touch-sensitive contact area and/or an operating element with a plurality of degrees of freedom, for adjustment purposes, for example.

Other objects, advantages and novel features of the present invention will become apparent from the following detailed description of the invention when considered in conjunction with the accompanying drawings.

BRIEF DESCRIPTION OF THE DRAWINGS

The single Figure is a block diagram of an operator control system for a vehicle, according to the invention.

DETAILED DESCRIPTION OF THE DRAWING

As can be seen from the figure, an operator control system 1 for a vehicle comprises a visual display unit 2 for displaying a menu structure of at least one operator control function. A central, manual operating device 5 is associated with the visual display unit 2 and provides a means by which an operator can control the at least one displayed operator control function. A plurality of further manual operating devices 3.1 to 3.4 are also provided, by which the operator can control operator control functions that are permanently associated with said operating device in each case. Finally, an evaluation and/or control unit 4 is provided.

The further manual operating device 3.1 to 3.4 each include a proximity sensor 3.5 to 3.8 which detects when an object (for example, a hand) approaches the respective operating means 3.1 to 3.4 associated therewith, and passes a corresponding signal to the evaluation and control unit 4. The proximity sensor 3.5 is associated with the operating element 3.1, while the proximity sensor 3.6 is associated with the operating element 3.2, the proximity sensor 3.7 is associated with the operating element 3.3, and the proximity sensor 3.8 is associated with the operating element 3.4. The proximity sensors 3.5 to 3.8 may, for example, be provided in the form of optical and/or capacitive and/or pressure-sensitive sensors.

The operator control functions displayed on the visual display unit 2 can be selected, activated, or set by the central, manual operating means 5. In the illustrated representative embodiment, the central, manual operating means 5 is in the form of a touch-sensitive contact area and comprises, for example, optical, capacitive, and/or pressure-sensitive sensors which are known from the prior art. Such sensors detect when the contact area is touched and generate corresponding signals that are evaluated by the evaluation and/or control unit 4, for the purpose of operator control of the displayed operator control functions.

The further manual operating means 3.1 to 3.4 are designed in the form of so-called "hard keys" with which specific operator control functions (or subfunctions of an operator control function) are associated.

Therefore, the further manual operating means 3.1, for example for adjusting the horizontal position of the seat, and the manual operating means 3.2 for adjusting the inclination of the backrest are provided for a "vehicle seat" operator control function. If one of the two proximity sensors 3.5 or 3.6 associated with the manual operating means 3.1 and 3.2 detects that the corresponding operating means 3.1 or 3.2 is being approached, the evaluation and/or control unit 4 activates the display of the "vehicle seat" operator control function on the visual display unit 2. The displayed "vehicle seat" operator control function comprises more functions than those mentioned, and these are likewise displayed. Therefore, it is now possible, in addition to the abovementioned functions, for these other functions of the "vehicle seat" operator control function (for example, massage function or cushion adjustment etc.) to also be subjected to operator control by the manual operating means 5 which is associated with the visual display unit 2.

By way of example, the further manual operating means 3.3 is provided for setting the temperature, and the manual operating means 3.4 is provided for the purpose of setting the blowers for an "air-conditioning system" operator control function. If one of the two proximity sensors 3.7 or 3.8 which are associated with the manual operating means 3.3 and 3.4 detects that the corresponding operating means 3.3 or 3.4 is being approached, the evaluation and/or control unit 4 activates the display of the "air-conditioning system" operator control function on the visual display unit 2. The displayed "air-conditioning system" operator control function also comprises, for example, the functions recirculated-air mode or fresh-air mode, activated carbon filter on or off etc. These functions are also displayed and may be subjected to operator control by the central manual operating means 5 in the manner already cited above.

The operator control system according to the invention makes it easy for an operator to control vehicle subsystems, such as the air-conditioning system, a navigation system, the vehicle seats, an audio system etc. Therefore, a plurality of hard keys are provided for the purpose of subjecting to operator control operator control functions or functions and/or subfunctions of the operator control functions, with the associated operator control function or the entire associated operator control menu for the corresponding vehicle subsystem advantageously being displayed on the visual display unit when the associated proximity sensor senses that an object is approaching one of the hard keys. In this way, the central manual operating device can also be used by a vehicle operator to control all of the functions of the corresponding vehicle subsystems, so that the user has easy access and "hidden functions" are virtually avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An operator control system for a vehicle, comprising:
a visual display unit that displays a plurality of operator control functions;
a central manual operating device associated with the visual display unit, that controls any of the plurality of displayed operator control functions;
at least one further manual operating device that permanently controls only one of the plurality of operator control functions;
at least one sensor which detects when an object approaches the at least one further operating device; and
means for causing the visual display unit to display the operator control function that the further manual operating device permanently controls in response to detection of an object approaching the at least one further operating device.

2. The operator control system a claimed in claim 1, wherein the visual display unit and its associated central manual operating device are arranged separately from one another.

3. The operator control system a claimed in claim 2, wherein the operator control function which is displayed on the visual display unit can be controlled by a vehicle operator control via either of the at least one central manual operating means and the at least one further manual operating means.

4. The operator control system as claimed in claim 3, wherein the operating control function can be displayed on the visual display unit in the form of a menu structure.

5. The operator control system as claimed in claim 4, wherein said display of said operator control function permits at least one additional subfunction or function variable of the displayed operator control function to be selected, activated or set via the central manual operating means.

6. The operator control system as claimed in claim 5, wherein the central operating means comprises one of the touch-sensitive contact area and an operating element with a plurality of degrees of freedom for adjustment purposes.

7. An operator control system for a vehicle, comprising:
a visual display unit for displaying visual indications of vehicle functions that can be controlled by a vehicle operator;
a central manual control device by which said operator controls any of a plurality of vehicle functions which are displayed on said visual display unit;
at least one further manual control device that permanently controls a specific vehicle function associated therewith;
means for detecting proximity of an object that approaches said at least one further manual control device; and
means responsive to detection of proximity of an object to said further manual control device, for causing said visual display unit to display additional vehicle functions related to said specific vehicle function, wherein said specific vehicle additional functions may be controlled by said central manual control device via said visual display unit.

8. The operator control system a claimed in claim 7, wherein the visual display unit and its associated central manual operating device are arranged separately from one another.

9. The operator control system as claimed in claim 7, wherein the operating control function can be displayed on the visual display unit in the form of a menu structure.

10. The operator control system as claimed in claim 7, wherein the central operating device comprises one of the touch-sensitive contact area and an operating element with a plurality of degrees of freedom for adjustment purposes.

11. An operator control system for a vehicle, comprising:
a visual display unit that displays visual indications of vehicle functions;
a central manual control device that controls any of a plurality of vehicle functions which are displayed on said visual display unit;
a first manual control device that permanently controls a first of the plurality of vehicle control functions;
a first proximity sensor that detects proximity of an object approaching the first manual control device;
a second manual control device that permanently controls a second of the plurality of vehicle control functions;
a second proximity sensor that detects proximity of an object approaching the second manual control device;
a control unit that causes the visual display unit to display the first of the plurality of vehicle control functions when the first proximity sensor detects an object approaching the first manual control device and display the second of the plurality of vehicle control functions when the second proximity sensor detects an object approaching the second manual control device.

12. The operator control system a claimed in claim 11, wherein the operating control function can be displayed on the visual display unit in the form of a menu structure.

13. The operator control system as claimed in claim 11, wherein the central operating device comprises one of the touch-sensitive contact area and an operating element with a plurality of degrees of freedom for adjustment purposes.

* * * * *